INVENTOR.
WILLIAM J. WACHTER
BY
ATTORNEY.

United States Patent Office 3,349,304
Patented Oct. 24, 1967

3,349,304
LONGITUDINAL MOVEMENT MECHANISM
William J. Wachter, Pittsburgh, Pa., assignor, by mesne assignments, to the United States of America as represented by the United States Atomic Energy Commission
Filed Apr. 5, 1965, Ser. No. 445,809
3 Claims. (Cl. 318—118)

This invention relates to a longitudinal movement mechanism, and more particularly to a magnetostrictive actuated longitudinal movement device.

Magnetostrictive materials have the property of changing physical dimensions when subjected to an applied magnetic field. A positive magnetostrictive material experiences a dimensional expansion in a direction parallel to an applied magnetic field. Alternately, a negative magnetostrictive material contracts in an applied magnetic field.

A mechanism of the type described herein is useful for imparting controlled longitudinal movement to an apparatus in either direction. Such a device is especially useful in moving and positioning an enclosed apparatus such as the control elements in a nuclear reactor of the type described in U.S. Patent No. 3,020,887 to Robert R. Holson and Hayden G. Wilcox.

In this application it is desirable that the movement providing device be relatively maintenance free, that the device provide exacting control for precise positioning of the control element, that the device be capable of vertically moving a large weight in the neighborhood of 2000 pounds, that the device be capable of moving a housed control element with a minimum of parts inside the housing, and that the device be capable of a wide range of speed including extremely fast movement under reactor scram conditions.

Further, in the usual nuclear reactor control rod system, the control rods are mechanically spring loaded so that upon the occurrence of a scram condition, the mechanism which raises and lowers the control rod under normal conditions is released allowing the spring to rapidly push the control rod into the reactor. Previous control rod drive mechanisms have generally required large and heavy direct mechanical connections to the control rod such as motor gear systems which are difficult to release in the short period necessary for a scram condition.

Keeping in mind the exacting requirements noted above and the shortcomings of the prior art, it is an object of this invention to provide a longitudinal movement mechanism having a novel movement actuator.

It is an object of this invention to provide a novel longitudinal movement mechanism having precision position control and variable speed of movement.

Further, it is an object of this invention to provide a longitudinal movement device having a minimum of moving parts.

It is a further object of this invention to provide a longitudinal movement device which can be rapidly disconnected from the apparatus being moved.

Various other objects and advantages will appear from the following description of one embodiment of the invention, and the most novel features will be particularly pointed out hereinafter in connection with the appended claims.

The mechanism of this invention for longitudinally moving an apparatus comprises a magnetostrictive element having a plurality of concentric alternating positive and negative magnetostrictive members connected to each other at alternating ends, a first clamp attached to one end of said element for holding the apparatus during movement, a second clamp for holding the apparatus to be moved while the first clamp is being positioned and means for actuating said element. The present invention is described in the accompanying drawings wherein.

Figure 1:
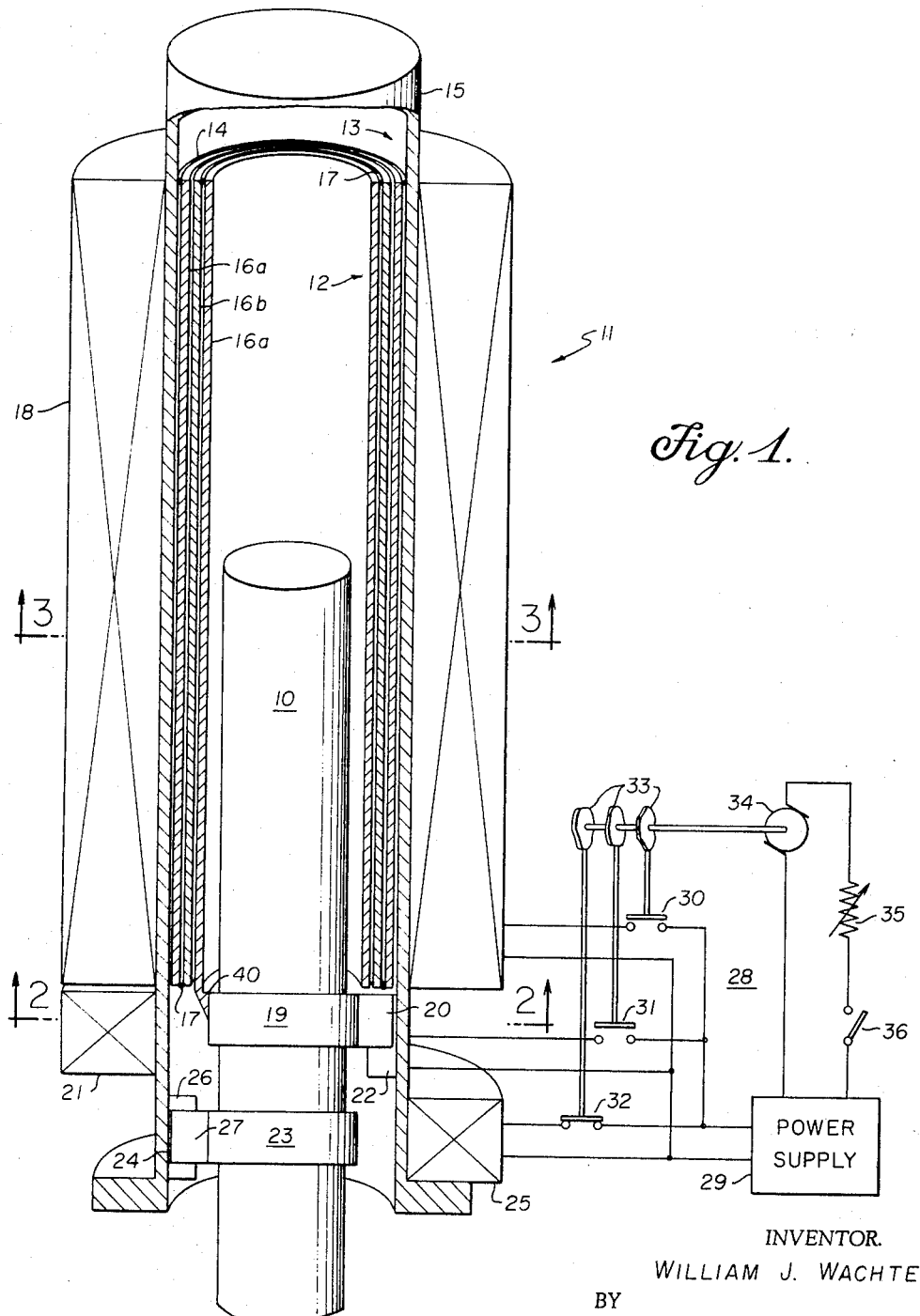
FIG. 1 is a longitudinal sectional view through a longitudinal movement mechanism embodying this invention.
Figure 2:
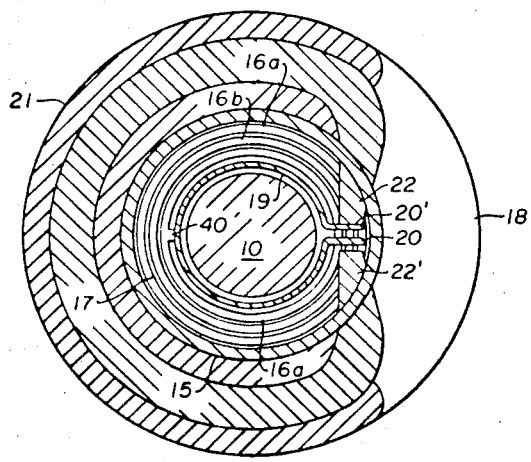
FIG. 2 is a cross section along line 2—2 of FIG. 1.
Figure 3:
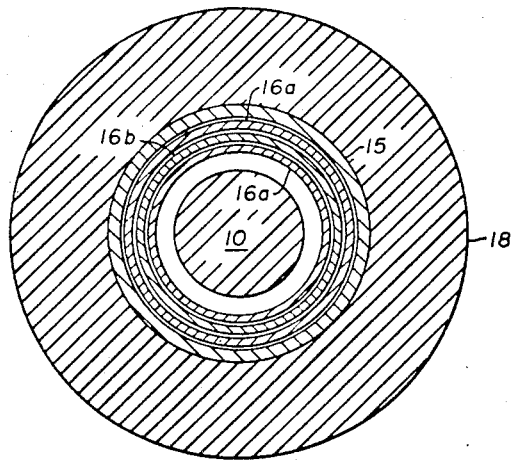
FIG. 3 is a cross section along line 3—3 of FIG. 1.

In the embodiment of this invention illustrated in FIGS. 1, 2 and 3, rod 10, which may be a control element for a nuclear reactor, is driven longitudinally by the movement producing mechanism 11. Mechanism 11 includes a magnetostrictive element 12 fixed at one end 13 by weld 14 to housing 15. In a nuclear reactor, housing 15 would be a part of the pressure vessel and is made of a nonmagnetic material such as stainless steel. Magnetostrictive element 12 is composed of a plurality of concentric, tubular, alternating positive and negative magnetostrictive members 16(a) and 16(b) respectively. The free end of outer member 16(a) is connected by welds 17 to the adjacent end of member 16(b) and so on to the innermost member 16(a). Annular magnetic coil 18, when energized, provides the magnetic field for actuating members 16(a) and 16(b). In the embodiment shown when magnetic coil 18 is energized, outer member 16(a) stretches so that the end connected to member 16(b) at weld 17 moves downward a given distance. At the same time member 16(b) contracts so that the end connected to inner member 16(a) at weld 17 moves downward a given distance including the stretching movement of outer member 16(a). Inner member 16(a) stretches so that its free end moves a distance equal to the cumulative stretching of inner and outer members 16(a) and contracting of member 16(b). When magnetic coil 18 is de-energized and the magnetic field removed, element 12 returns to its original position.

An electromagnetic clamp 19 (shown in cross section in FIG. 2), having lips 20 and 20′, is attached to the free end of innermost member 16(a) at point 40 and at lip 20′ (not shown). Clamp 19 is actuated by energizing U-shaped magnetic coil 21 so that the resulting magnetic field pulls lip 20 towards pole piece 22 thereby gripping rod 10. Pole pieces 22 and 22′ and magnetic coil 21 preferably are of sufficient width to accommodate the total longitudinal movement of clamp 19. The cumulative longitudinal force exerted by element 12 and the resulting cumulative movement of clamp 19 is a function of the magnetostrictive properties of each member, the length of the element, the number of members and the strength of the magnetic field exerted by magnetic coil 18.

A holding clamp 23 (similar to clamp 19 as shown in FIG. 2), fixed to the inner surface of housing 15 at point 24, is disposed preferably below element 12 in operable relationship with rod 10. Holding clamp 23 is actuated by energizing U-shaped magnetic coil 25 so that the resulting magnetic field through pole piece 26 pulls lip 27 towards pole piece 26 thereby gripping rod 10.

Magnetic coils 18, 21 and 25 are energized in a controlled sequence by circuit 28. In the embodiment shown in FIG. 1, circuit 28 includes a common D.C. power supply 29 connected to magnetic coils 18, 21 and 25 through cam operated switches 30, 31 and 32. Cams 33 are rotated by D.C. motor 34 at a rate of speed controlled by field control rheostat 35 through switch 36 to power supply 29. Circuit 28 actuates switches 30, 31 and 32 in one of two sequences (not one of which is shown) at varying speeds depending on the desired direction of movement of rod 10 and the desired speed of that movement. The second sequence of switch actuation can be obtained by providing a second set of cams for each switch and means for moving the cam shaft so as to place the alternate cam set in operable relationship with the switches in a manner well known in the art.

It is understood that circuit 28 can use other types of switches, such as relays, electronic switches or silicon controlled relays, and suitable control circuitry associated therewith in a manner well known in the art.

The positive magnetostrictive members 16(a) can be made of a 68% nickel-iron alloy or any other material which stretches in a magnetic field. The negative magnetostrictive members 16(b) can be made of a 93% nickel-iron alloy for example or any other material which contracts in a magnetic field. By energizing electromagnet 18 with a D.C. pulse, the magnetostrictive motion of clamp 19 can be magnified to about 0.010 inch. The rates of rod 10 motion can be varied from about 0.010 inch min. to about 12 inches/min. with a rod weight as high as 2000 pounds.

In order to raise rod 10, the following sequence of operations starting with all elements de-energized is used;

(1) Actuate clamp 23 by energizing coil 25 with power supply 29 through control circuit 28 and switch 32 thereby gripping rod 10.

(2) Energize coil 18 with power supply 29 through control circuit 28 and switch 30 thus elongating magnetostrictive element 12 and lowering clamp 19 longitudinally.

(3) Actuate clamp 19 by energizing coil 21 with power supply 29 through control circuit 28 and switch 31 thereby gripping rod 10.

(4) Release clamp 23 by turing off switch 32 and de-energizing coil 25 thereby releasing rod 10.

(5) De-energize coil 18 by turning off switch 30 allowing magnetostrictive element 12 to contract thereby raising rod 10.

(6) Actuate clamp 23 in the same manner as step 1 to again grip rod 10.

(7) Release clamp 19 by turning off switch 31 and de-energizing coil 21 so that rod 10 is gripped solely by clamp 23.

(8) Repeat steps 2 through 7 until rod 10 has reached the desired position.

In order to lower rod 10, the following sequence of operations starting with holding clamp 23 energized is used;

(a) Actuate clamp 19.
(b) Release clamp 23.
(c) Energize coil 18 thus elongating magnetostrictive element 12.
(d) Actuate clamp 23.
(e) Release clamp 19.
(f) De-energize coil 18 allowing magnetostrictive element 12 to contract.
(g) Actuate clamp 19.
(h) Release clamp 23.
(i) Repeat steps (c) through (g).

It will be understood that various changes in the details, materials and arrangements of the parts, which have been herein described and illustrated in order to explain the nature of the invention may be made by those skilled in the art within the principles and scope of the invention as expressed in the appended claims.

I claim:

1. A mechanism for longitudinal displacement of a rod enclosed by a housing, comprising:
    (a) a magnetostrictive element surrounding said rod, said magnetostrictive element having a plurality of concentric alternating positive and negative magnetostrictive members, each member connected to the succeeding member at alternating ends beginning with the outer member fixed at one end to the inner surface of said housing,
    (b) longitudinal moveable means attached to the free end of the innermost member of said magnetostrictive element for clamping said rod and moving said rod longitudinally in response to the magnetostrictive movement of said magnetostrictive element,
    (c) means fixed to the inner surface of said housing for holding said rod from movement,
    (d) magnetic means for actuating said magnetostrictive element and,
    (e) a first and second energizing means for sequentially actuating said holding means and said clamping means.

2. The mechanism of claim 1 having a control means for pulsing said magnetic means and said first and second energizing means in a predetermined sequence for moving said rod in either direction.

3. The mechanism of claim 1 wherein said first and second energizing means each includes a magnetic coil.

References Cited

UNITED STATES PATENTS

| | | | |
|---|---|---|---|
| 2,433,337 | 12/1947 | Bozorth | 340—11 |
| 2,476,778 | 7/1949 | Smoluchowski | 318—118 X |
| 2,506,141 | 5/1950 | Drouin | 318—118 X |
| 2,843,974 | 7/1958 | Butterworth et al. | 51—103 |
| 2,843,975 | 7/1958 | Kamm | 51—103 |
| 2,843,976 | 7/1958 | Silver | 51—103 |
| 3,138,749 | 6/1964 | Stibitz | 310—12 X |
| 3,217,218 | 11/1965 | Steele | 318—135 X |

FOREIGN PATENTS

| | | |
|---|---|---|
| 752,317 | 7/1956 | Great Britain. |

MILTON O. HIRSHFIELD, *Primary Examiner.*

D. F. DUGGAN, *Assistant Examiner.*